United States Patent
Pakzad et al.

(10) Patent No.: US 7,596,722 B1
(45) Date of Patent: Sep. 29, 2009

(54) ASYNCHRONOUS AUTOMATIC SOFTWARE MODULE UPDATES IN A MULTI-CELL DISK DRIVE TEST SYSTEM

(75) Inventors: Mostafa Pakzad, Palos Verdes Peninsula, CA (US); Peter Cheok Him Pang, Rancho Santa Margarita, CA (US); Mohammad R. Bahadori, Irvine, CA (US); Joseph M. Viglione, Laguna Hills, CA (US); Roma Leang, Irvine, CA (US); Boon Nee Yang, Pandamaran (MY)

(73) Assignee: Western Digital Technologies, Inc., Lake Forest, CA (US)

( * ) Notice: Subject to any disclaimer, the term of this patent is extended or adjusted under 35 U.S.C. 154(b) by 391 days.

(21) Appl. No.: 11/353,352

(22) Filed: Feb. 14, 2006

(51) Int. Cl.
*G06F 11/00* (2006.01)
(52) U.S. Cl. .................................... 714/42
(58) Field of Classification Search .................. None
See application file for complete search history.

(56) References Cited

U.S. PATENT DOCUMENTS

| | | | |
|---|---|---|---|
| 4,348,761 A | 9/1982 | Berger | |
| 5,469,361 A * | 11/1995 | Moyne | 700/95 |
| 6,104,985 A | 8/2000 | Sowards | |
| 6,169,413 B1 | 1/2001 | Paek et al. | |
| 6,278,959 B1 | 8/2001 | Alferness | |
| 6,321,352 B1 | 11/2001 | Wasson | |
| 6,327,150 B1 | 12/2001 | Levy et al. | |
| 6,467,153 B2 | 10/2002 | Butts et al. | |
| 6,505,281 B1 | 1/2003 | Sherry | |
| 6,651,192 B1 | 11/2003 | Viglione et al. | |
| 6,865,514 B1 | 3/2005 | Goguen et al. | |
| 6,897,393 B1 | 5/2005 | Codilian et al. | |
| 7,076,391 B1 | 7/2006 | Pakzad et al. | |
| 7,136,768 B1 | 11/2006 | Shah et al. | |
| 2004/0068330 A1 * | 4/2004 | White | 700/18 |
| 2004/0088696 A1 * | 5/2004 | Kawano et al. | 717/171 |
| 2004/0193295 A1 * | 9/2004 | Kaneko | 700/87 |
| 2005/0203645 A1 * | 9/2005 | Klopfer et al. | 700/79 |

OTHER PUBLICATIONS

Office Action dated Oct. 30, 2007 from U.S. Appl. No. 11/287,723 (12 pages).
Office Action dated Apr. 3, 2007 from U.S. Appl. No. 11/287,723 (6 pages).

(Continued)

*Primary Examiner*—Michael C Maskulinski
(74) *Attorney, Agent, or Firm*—Blakely, Sokoloff, Taylor & Zafman (57) ABSTRACT

A multi-cell disk drive test system that provides for asynchronous software module updates that includes a test platform, one or more test manager computers (TMCs), and a test coordinator computer (TCC). The test platform includes a plurality of cells in which each cell is configured to receive and to provide communication with a disk drive. The TCC is configured to communicate with one or more TMCs and to store a plurality of updated software module versions. After a disk drive is determined to be in an appropriate cell, the TMC: determines a test step to be performed on the disk drive and a cell software module currently stored for the cell; determines if an updated software module version associated with the test step is stored on the TCC, and if so, downloads the updated software module version, and updates the TMC with the updated cell software module version.

20 Claims, 7 Drawing Sheets

OTHER PUBLICATIONS

Zunzanyika, et al., "Simultaneous Development & Qualification in the Fast-Changing 3-5' Hard-Disk-Drive Technology", 1995 Proceedings Annual Reliability and Maintainability Symposium, pp. 27-32.
"Automated Production Test Solutions" brochure, Xyratex Corporation, 6 pages.
Office Action mailed May 15, 2007 from U.S. Appl. No. 11/287,723, 12 pages.
Office Action dated Feb. 10, 2006 from U.S. Appl. No. 10/283,146, 7 pages.
Office Action dated May 5, 2006 from U.S. Appl. No. 10/286,146, 7 pages.
U.S. Appl. No. 11/190,281, filed Jul. 26, 2005, 48 pages.
Office Action dated Jun. 18, 2008 from U.S. Appl. No. 11/287,723, 14 pages.
Interview Summary dated Jan. 26, 2009 from U.S. Appl. No. 11/287,723, 4 pages.
Office Action dated Dec. 22, 2008 from U.S. Appl. No. 11/287,723, 11 pages.

* cited by examiner

ASYNCHRONOUS AUTOMATIC SOFTWARE MODULE UPDATES IN A MULTI-CELL DISK DRIVE TEST SYSTEM

BACKGROUND

1. Field of the Invention

The present invention relates to methods and systems for asynchronously testing and carrying out testing procedures on disk drives, and more particularly, to providing asynchronous automatic software module updates in a multi-cell disk drive test system used to test disk drives.

2. Description of the Prior Art and Related Information

Figure 1:
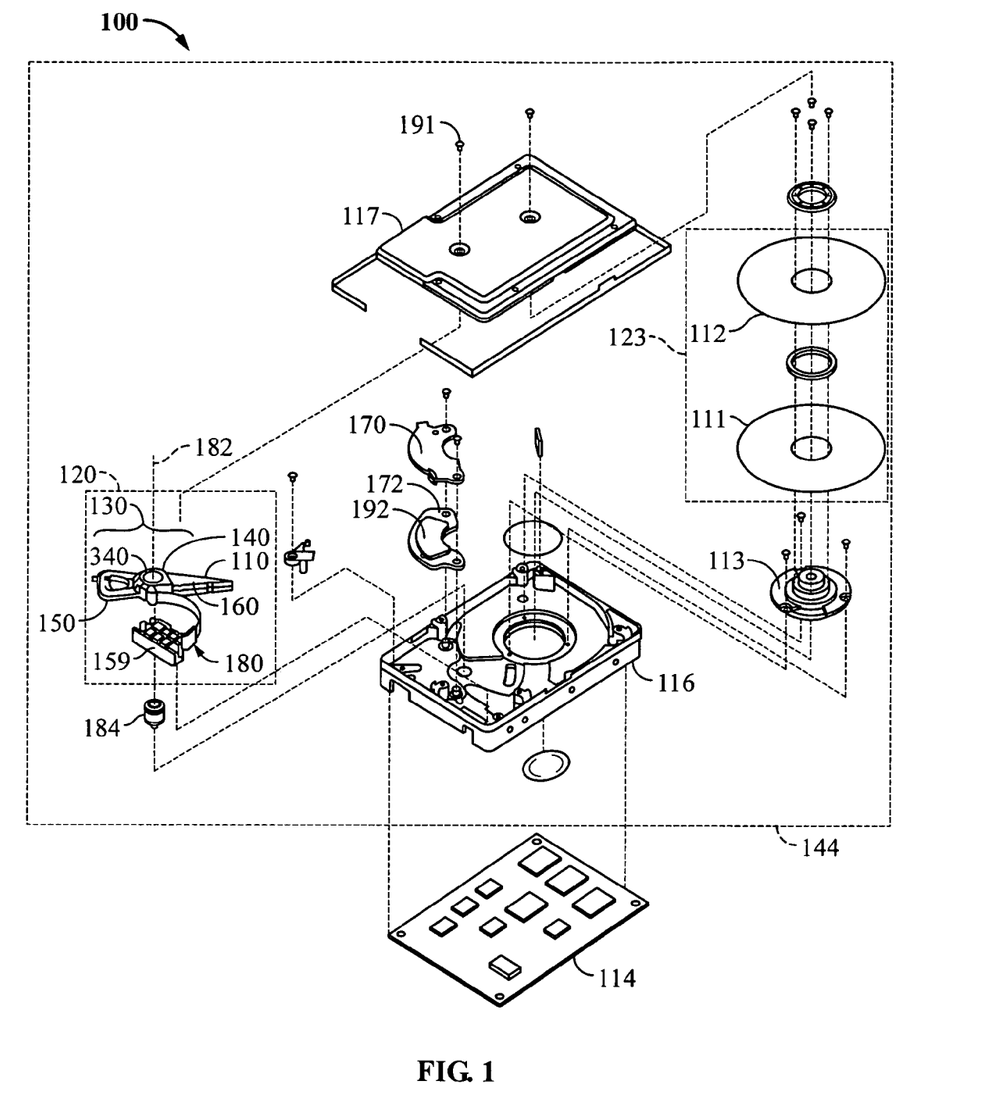
FIG. 1 is a diagram of the basic components of a disk drive.

FIG. 1 shows the principal components of a magnetic disk drive 100 that may be tested in a multi-cell disk drive testing system. With reference to FIG. 1, the disk drive 100 comprises a head disk assembly (HDA) 144 and a printed circuit board assembly (PCBA) 114. The HDA 144 includes a disk drive enclosure comprising base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot bearing cartridge 184 that rotatably supports the head stack assembly (HSA) 120 on the base 116. The spindle motor 113 rotates the disk stack 123 at a constant angular velocity.

The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports the slider(s). The flex cable assembly 180 may include a flex circuit cable and a flex clamp 159.

The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112.

After the HDA 144 and the PCBA 114 are mated, the disk drive must undergo a variety of tests and procedures to configure and validate the proper operation of the disk drive. Such testing conventionally is carried out in a "single plug tester", which is a test platform that includes a bank of cells into which the disk drives are manually loaded and unloaded. A sequential series of tests and procedures are then carried out on the loaded disk drives. Some of the test and procedures are subject to strict environmental control requirements. Conventionally, the drives remain in the same cell during the administration of the entire sequence of tests, and are removed in batch only at the conclusion of the sequence of tests.

It may be appreciated, however, that such a test platform architecture may lead to inefficiencies. Some of these inefficiencies are organic to the structure of the test platform and to its batch mode of operation, while other inefficiencies stem from various evolutionary changes in the disk drives themselves. At the outset, the batch mode of operation of single plug testers limit the platform's throughput to the time required for the slowest drive to complete the prescribed sequential series of tests. Drives that may complete the sequential series faster than others (for whatever reason) or fail any test must sit idle and occupy a cell that would otherwise be available for the administration of tests to another disk drive.

Some evolutionary changes of the disk drives themselves that affect the operation of conventional test platforms include the ongoing transition from drives having a parallel interface (e.g., EIDE drives) to drives having a serial interface (such as Serial Advanced Technology Architecture or SATA). However, even during this transition to serial drives, there remains a non-negligible demand for drives having a parallel interface. Therefore, from a manufacturing point of view, both parallel and serial drives should continue to be manufactured, at least during this period of transition.

Adding to the complexity of the testing of disk drives, is that each cell may be configured to run a different test procedure that may be based upon one of various downloaded software modules for multiple classes of disk drives. The introduction of a new software module updates for a new test procedure or modified versions of existing ones presently introduces a very complex task in that the entire multi-cell disk drive test system has to be taken off-line while updated software modules to implement various test procedures for various classes of disk drives are loaded into the system.

This results in a great deal of down-time for the multi-cell disk drive test system and consequently a large inefficiency in the disk drive testing process. A great deal of cost is added to the disk drive manufacturing process due to this inefficiency. Because disk drive testers represent such large capital expenditures for disk drive manufacturers, more efficient testers and testing procedures are continuously sought after in order to reduce inefficiencies and costs and to increase throughput.

SUMMARY

The present invention relates to methods and systems for asynchronously testing and carrying out testing procedures on disk drives, and more particularly, to providing asynchronous automatic software module updates in a multi-cell disk drive test system used to test disk drives.

In one aspect, the invention may be regarded as a multi-cell disk drive test system that provides for asynchronous software module updates. The multi-cell disk drive test system includes a test platform, a test manager computer, and a test coordinator computer. The test platform includes a plurality of cells in which each cell is configured to receive and to provide communication with the disk drive, and in which the plurality of cells may be segregated into a plurality of groups. A test manager computer is assigned to each group of cells. Each test manager computer is coupled to an assigned group of cells to administer at least one of a plurality of test steps to disk drives loaded in the assigned group of cells. The test coordinator computer is configured to communicate with each test manager computer and to store a plurality of updated software module versions.

After a disk drive is determined to be in an appropriate cell, the test computer manager: determines a test step to be performed on the disk drive and a cell software module currently stored for the cell; determines if an updated software module version associated with the test step is stored on the test coordinator computer, and if so, downloads the updated software module version, and updates the test manager computer with the updated cell software module version.

In one embodiment, a host server may store a plurality of updated software module versions that are transmitted through a network to the test coordinator computer. The network may be a private network and the plurality of updated software module versions may be specific to a particular disk drive manufacturer.

In one embodiment, after updating the test manager computer with the updated cell software module version for the cell, the test manager computer may store a cell identifier for the cell and the version number of the updated cell software module. The test manager computer may further store test steps supported by the disk drive of the cell. The test manager computer may also instruct the cell to perform the test step on the disk drive utilizing the updated cell software module. Additionally, the test manager computer may transmit the updated cell software module to the cell such that the cell performs a test step on the disk drive utilizing the updated cell software module.

In one embodiment, an automated loader/unloader may be configured to selectively load disk drives into and out of the test platform and to move disk drives between the plurality of groups. The automatic loader/unloader may be a robotic loader/unloader.

In one embodiment, each cell may be configured to selectively communicate with a disk drive loaded therein over a serial or parallel interface. Further, each test manager computer may be configured to selectively communicate with a cell of the group of cells in one of a serial or parallel protocol.

In another aspect, the invention may be regarded as a method for providing asynchronous software module updates in a multi-cell disk drive test system used for testing a plurality of disk drives that includes a test platform having a plurality of cells in which each cell is configured to receive and to provide communication with the disk drive, and in which the plurality of cells are segregated into a plurality of groups. The method includes: determining a test step to be performed on the disk drive; determining a cell software module currently stored for the cell; determining if an updated cell software module version associated with the test step is available for downloading, and if so, downloading the updated cell software module version and utilizing the updated cell software module to perform the test step on the disk drive of the cell.

In yet another aspect, the invention may be regarded as a multi-cell disk drive test system used for testing a plurality of disk drives that includes a test platform having a plurality of cells in which each cell is configured to receive and to provide communication with the disk drive and in which the plurality of cells are segregated into a plurality of groups, and particularly, to a computer-readable medium having stored thereon instructions which when executed by a computer, cause the computer to perform the following operations including: determining a test step to be performed on the disk drive; determining a cell software module currently stored for the cell; determining if an updated cell software module version associated with the test step is available for downloading, and if so, downloading the updated cell software module version and utilizing the updated cell software module to perform the test step on the disk drive of the cell.

The foregoing and other features of the invention are described in detail below and are set forth in the appended claims.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Figure 2:
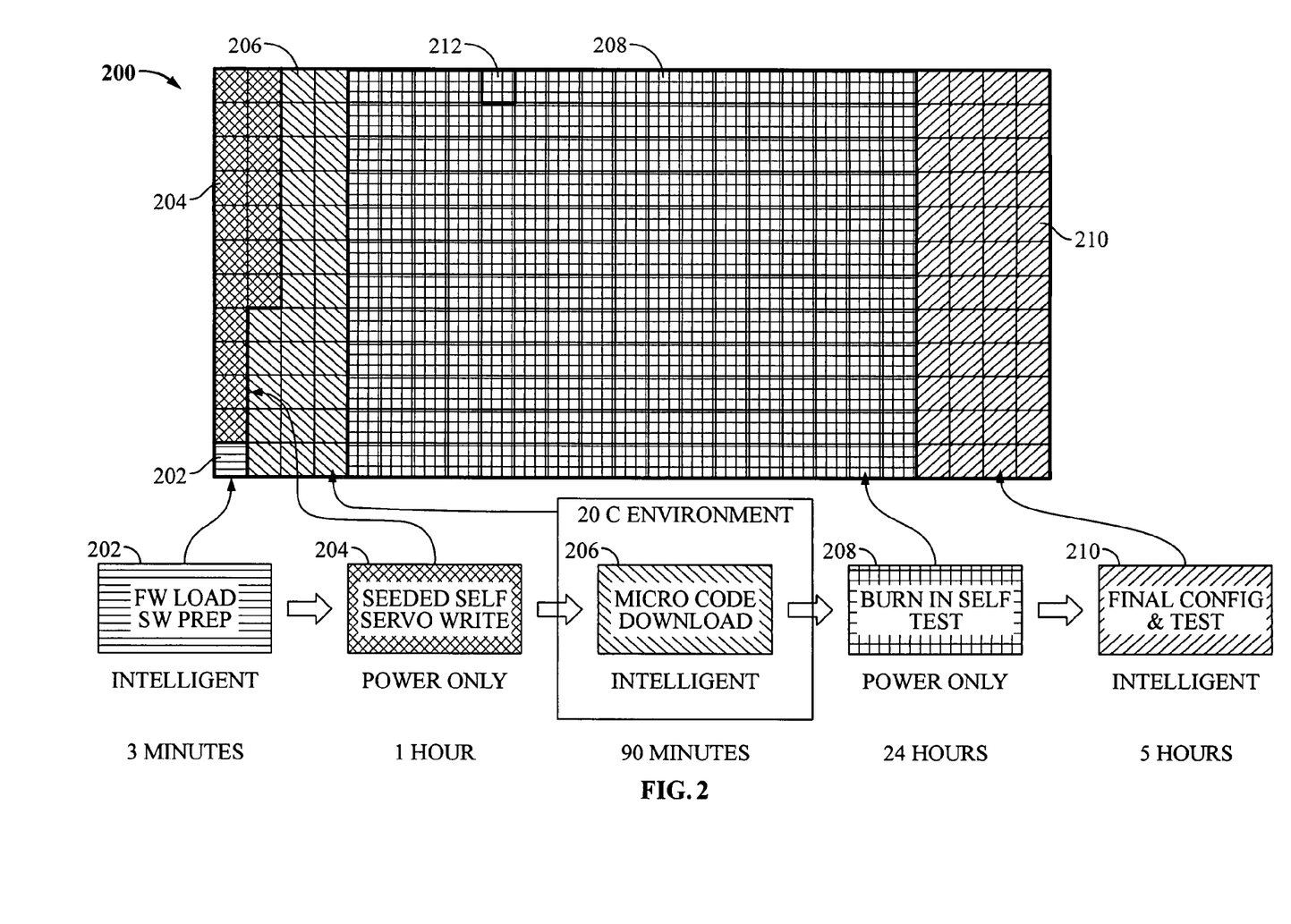
FIG. 2 is a functional diagram of a test wall for carrying out a sequential series of test or procedures on disk drives, in which embodiments of the invention may be practiced.

FIG. 2 is a functional diagram of a test wall 200 for carrying out a sequential series of test or procedures on disk drives. As shown, the test wall 200 includes a plurality of cells, such as cell 212, into which the drives under test may be loaded and unloaded to administer a sequential series of tests or procedures on the drives. Each cell is configured to receive a disk drive under test (such as shown at 100 in FIG. 1) and provide communication between the drive under test and a host, such as a test computer discussed below. The plurality of cells 212 of the test wall 200 may be segregated into a plurality of groups. Each group of cells 212 may be configured to satisfy predetermined environmental (such as, for example, temperature, humidity, etc.), communication bandwidth and test schedule requirements of the drives under test to be loaded therein. As shown, the number of cells 212 in each of the groups may be roughly proportional to the time required the tests or procedures to be carried out on the drives loaded in the cells of the group.

Underneath the test wall 200 of FIG. 2 is an exemplary series of sequential tests detailing the tests and procedures that may be sequentially carried out. For example, the groups of cells 212 may include a first group 202 of cells 212 dedicated to loading necessary firmware and software into the drives loaded therein. The approximate time required to carry out the tests and/or procedures on the drives under test are noted under each group, it being understood that these times are included herein for exemplary purposes only. As shown, the software and firmware loading in group 202 takes a comparatively short period of time, on the order of about three minutes. Also noted under each of the groups is the legend "Intelligent" or "Power Only", depending on whether the drives under test require communication with a host. Groups labeled "Intelligent" require that the drives under test loaded in the group communicate with a host, such as a test computer (discussed below), whereas groups labeled "Power Only" do not require communication with a host and require power only to complete the tests and/or procedures to be carried out within the group.

The next group 204 of cells 212 in the exemplary test schedule shown in FIG. 2 supports a seeded self-servo write procedure, in which servo information is written to the disk or disks of the drive under test loaded therein. During this procedure, servo sector information is being written to the drive without using a servo track writer. As servo track writing is a time consuming process that is directly proportional to the aerial density of the disk, reducing the number of servo sectors the servo track writer lays down on the disk saves manufacturing time and costs. By reducing the number of servo sectors written by the servo track writer to, for example, every other servo sector and allowing the seeded self-servo write procedure carried out in the group 204 to interpolate between the written servo sectors, significant saving in both the time and costs are achieved. In such a process, the servo track writer writes a number of reference tracks and the seeded self-servo write procedure essentially performs an inbetweening process to write servo tracks between the reference tracks written by the servo track writer. Group 204 does not require communication with a host, as the software necessary to perform the seeded self-servo write has been previously downloaded to the drive while the drive was loaded into one of the cells 212 of group 202.

The next group 206 of cells 212 supports microcode download, which is preferably carried out in an environmentally controlled environment, such as 20° C. As the microcode is downloaded from a host, communications between the drive under test loaded into the cells 212 of the group 206 and the host (a test computer) are necessary, hence the label "Intelligent" for group 206. The group having the largest number of cells 212 may be the group 208 in which the tests that take the longest time to complete are administered. Group 208 supports the initial burn in self-test (IBI self test), in which a lengthy calibration of the drive is performed, as well as procedures to discover, map and manage the defects on the media. The length of time necessary to complete this test is roughly proportional to the storage capacity of the drive under test.

The next and final group 210 of cells may be dedicated to administering final configurations and tests. This group 210 requires communication with a test computer, so as to verify the proper operation of host commands and analyzing and validating the results of the IBI self-test carried out in the group 208. Desired performance characteristics of the drive, such as head seek time, for example, may be verified within this group 210 of cells 212, if desired. It is understood that other tests and procedures may be carried out on the drives under test, in addition or in place of the tests discussed above, such as a debug process when a fault is found during testing. Such debug tests may be performed to isolate the fault, so as to facilitate the correction thereof.

Figure 3:
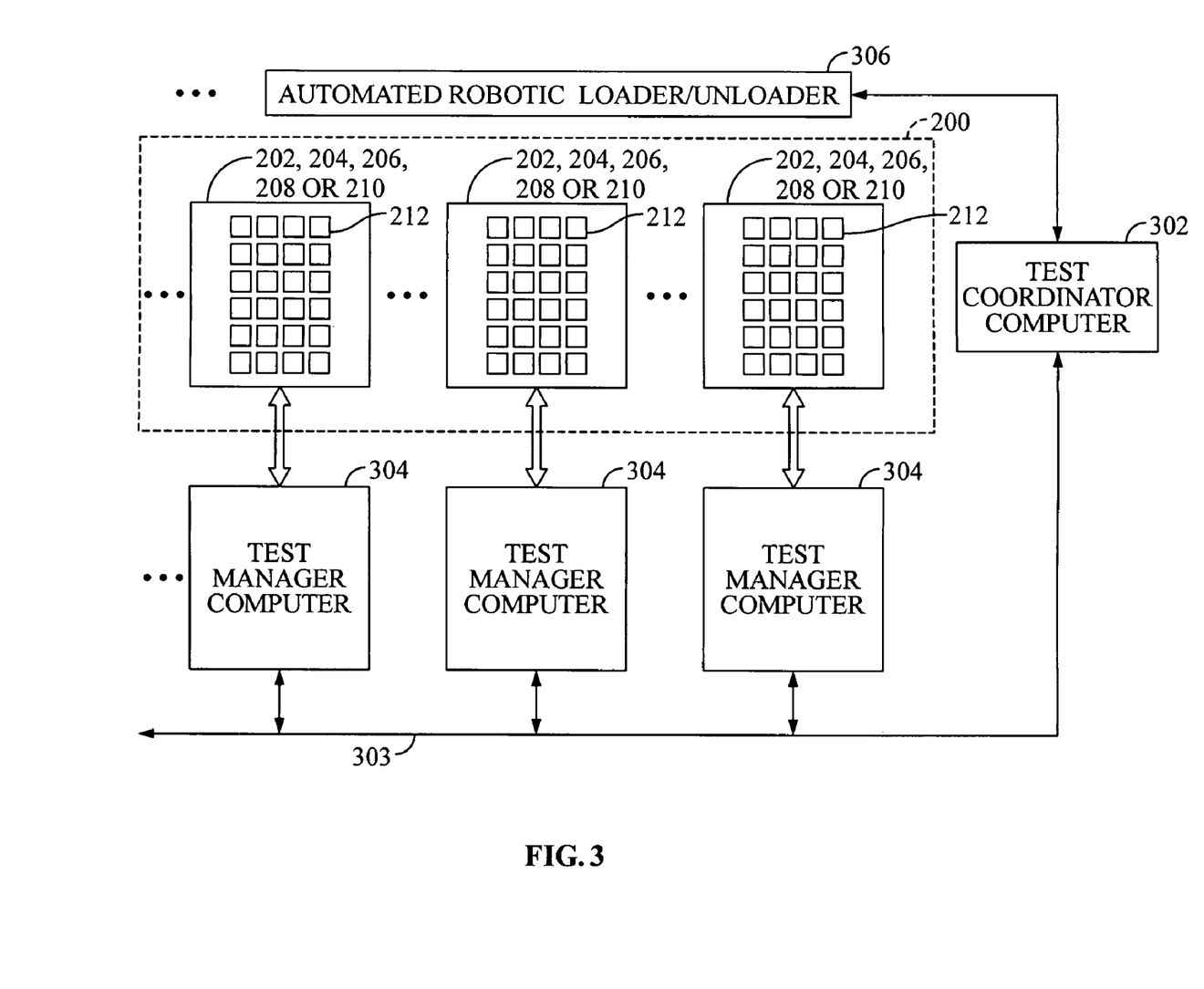
FIG. 3 is a diagram of an asynchronous disk drive system for testing a plurality of disk drives and that provides for asynchronous automatic software module updates, according to an embodiment of the present invention.

FIG. 3 is a diagram of an asynchronous disk drive system for testing a plurality of disk drives and that provides for asynchronous automatic software module updates, according to an embodiment of the present invention. The system includes the test platform 200 that has a plurality of cells 212, each cell 212 being configured to receive and to provide communication with a disk drive under test. As detailed above, the plurality of cells may be segregated into a plurality of groups 202, 204, 206, 208 or 210 and each such group may be configured to satisfy predetermined environmental, communication bandwidth and test schedule requirements of the disk drives to be loaded therein. In particular, each of the cells 212 may be self-contained with respect to environmental, communication bandwidth and test schedule requirements, thereby enabling any of the disk drives to be loaded into or unloaded from any of the cells 212 without affecting any of the other drives loaded in any of the other cells 212 and without affecting the testing or procedures carried out on the drives.

Also shown is an automated loader/unloader 306 that is configured to selectively load disk drives into and out of the test platform 200 and to move disk drives between cells of the plurality of groups. Portions of the system (such as the test wall 200) may be obtained from, for example, Xyratex International of San Jose, Calif. (on the World Wide Web at www.xyratex.com). According to one embodiment of the present invention, the automated loader/unloader is robotic, and is coupled to and controlled by a computer, shown in FIG. 3 as the test coordinator computer 302. The test coordinator computer 302, is aware of the current status of each drive under test within the system through test manager computers 304.

In one embodiment, the test coordinator computer 302 may issue commands that cause the automated loader/unloader to move the drives into and out of the system, as well as between groups thereof. The test coordinator computer 302 may be coupled to the automated loader/unloader and to the test manager computers 304 via an Ethernet connection 303, for example. One or more test manager computers 304 are assigned to each group 202, 204, 206 or 208 of cells 212. In this example, one test manager computer 304 is assigned to a group of twenty-four cells. Each group has at least one test manager computer 304 assigned thereto and connected to its constituent cells 212.

Each test manager computer 304 is configured, according to the present invention, to act as an I/O controller for the drives to which it is connected and to administer at least one of the sequential tests to the disk drives loaded in the cells 212 of its assigned group, all the while insuring that the predetermined environmental, communication bandwidth and test schedule requirements of its assigned group remain satisfied.

The test coordinator computer 302 is coupled to and communicates with each test manager computer 304 and is also coupled to and controls the automated loader/unloader 306 as it moves disk drives under test into the test platform 200, out of the test platform and between groups.

The movement of each disk drive into, out of, and between groups 202, 204, 206 or 208 of the test platform 200 is carried out asynchronously by the automated loader/unloader 306. That is, the system does not wait for all disk drives under test loaded into the cells 212 of a given group to have finished the administered test and does not move the disk drives in batch mode out of the test platform or to cells of another group. Instead, as individual disk drives fail any test or procedure, pass a test or complete a procedure or complete the entire series of sequential tests, they are moved asynchronously, as and when needed. This leads to great efficiencies in the full usage of the cells 212 of the test platform, as drives are moved in and out of the test platform and within the test platform as needed, and are not limited by the slowest drive finishing the administered test or the entire test sequence.

According to an embodiment of the present invention, test manager computers 304 may communicate with the drives under test loaded into the cells 212 according to the Serial Advanced Technology Architecture (ATA) point-to-point protocol. SATA is a widely used acronym for the serial ATA protocol. However, other serial and/or parallel protocols may be utilized. For example, other parallel interfaces and protocols such as, EIDE, PATA, etc, may be utilized as well as other types of serial interfaces and protocols such as, SCSI, Firewire, Fiber Channel, USB, SAS, etc. Also, both the test coordinator computer 302 and the test manager computers 304 may be or include personal computers (PCs) running, for example, a Linux operating system or a Microsoft operating system, such as Windows XP or Windows 2000 Professional for example.

Components of the various embodiments of the invention may be implemented is hardware, software, firmware, microcode, or any combination thereof. When implemented in software, firmware, or microcode, the elements of the embodiment of the present invention are the program code or code segments to perform the necessary tasks. A code segment may represent a procedure, a function, a subprogram, a program, a routine, a subroutine, a module, a software package, a class, or any combination of instructions, data structures, or program statements. The program or code segments may be stored in a computer or processor readable medium or transmitted by a computer data signal embodied in a carrier wave, or a signal modulated by a carrier, over a transmission medium. The "processor readable or accessible medium" or "computer readable or accessible medium" may include any medium that can store, transmit, or transfer information. Examples of the computer accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The computer accessible medium may include data that, when accessed by a computer, cause the computer to perform the operation described in the following. The term "data" herein refers to any type of information that is encoded for machine-readable purposes. Therefore, it may include program, code, data, file, etc.

All or part embodiments of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

Figure 4:
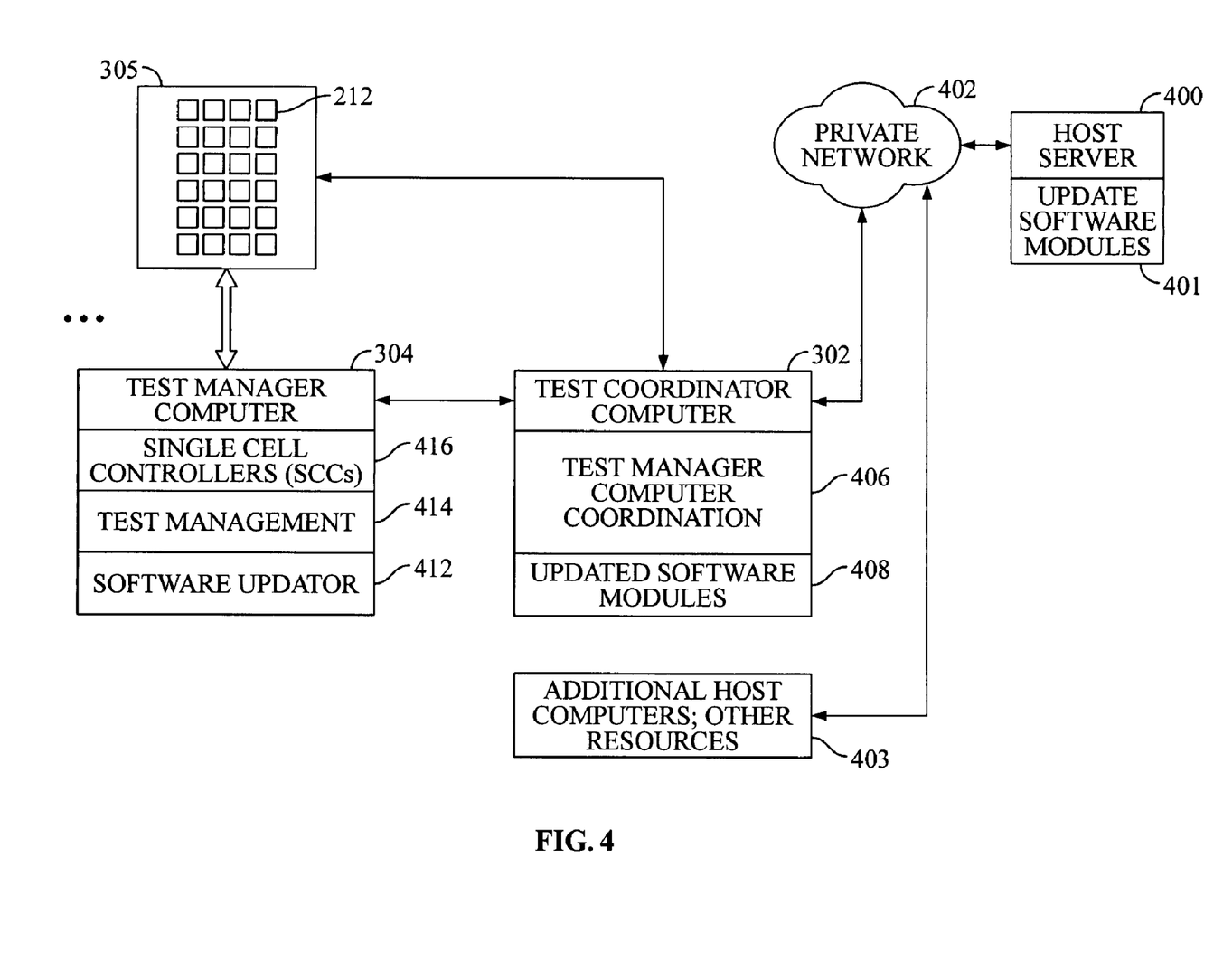
FIG. 4 is a block diagram illustrating more detailed aspects of the test manager computer and the test coordinator computer in a network environment that provides for asynchronous software module updates, according to one embodiment of the invention.

Turning now to FIG. 4, FIG. 4 is a block diagram illustrating more detailed aspects of the test manager computer 304 and the test coordinator computer 302 in a network environment that provides asynchronous software module updates, according to one embodiment of the invention. In this example, the multi-cell disk drive test system includes a test manager computer 304, a test coordinator computer 302, and a test platform 305 having a plurality of cells 212.

As previously discussed, the test platform includes a plurality of cells 212 in which each cell 212 is configured to receive and to provide communication with a disk drive loaded therein, and in which the plurality of cells may be segregated into a plurality of groups. A test manager computer 304 is assigned to each group of cells—illustrated here as group of cells 305. Test manager computer 304 is coupled to an assigned group of cells 305 to administer at least one of a plurality of tests steps to the disk drives loaded in the assigned group of cells 305. In this example, test manager computer 304 includes a software updater module 412, test management software module 414, and a plurality of single cell controllers 416.

Software updater module 412 controls software updates for the cells 212. Particularly, software updater module 412 controls updating software modules for the single cell controllers (SCCs) 416, updating software or firmware within a cell 212 itself, as well as updating other firmware or software components of the test manager computer 304.

Test management software module 414 controls the general operations of the test management computer 304 in performing its testing operations including the control of test steps to be performed on the disk drives loaded in the cells in conjunction with the SCCs 416. Each cell has an assigned SCC 416, and the assigned SCC controls the test step operations for the assigned cell to perform the desired test step on the disk loaded in the assigned cell.

The test coordinator computer 302 is configured to communicate with each test manager 304 (only one shown) and to store a plurality of updated software module versions. As shown in FIG. 4, test coordinator computer 302 may include test manager computer coordination software module 406 and updated software module versions 408. Test manager computer coordination software module 406 controls the coordination functions and instructions to the various test manager computers 304.

As will be discussed, after a disk drive is determined to be in appropriate cell 212, the test manager computer 304 utilizing test manager software module 414 and software updater module 412 determines a test step to be performed on a disk drive loaded into a cell and the cell software module currently stored for the cell. The cell software module may be associated with the SCC for the cell or may be loaded in the disk drive or cell itself.

In one embodiment, software updater module 412 scans through all of the cell software module version numbers, and if there are updated software modules stored by the test coordinator computer 302, the software updater module 412 copies the appropriate updated software module by over-writing the older cell software module in the test manager computer 304. Software updater module 412 may do this automatically upon insertion of a disk drive into a cell, automatically at specified times, or may do this upon the request of a test operator having requisite authorization.

Software updater module 412 determines if an updated software module version associated with the test step to be performed on a disk drive is stored on the test coordinator computer 302, and if so, the software updater module 412 downloads the updated software module version, and updates the test manager computer 304 with the updated cell software module version. Particularly, the software updater module 412 may update the appropriate SCC assigned to the cell with the appropriate software module or firmware module update or may update the cell itself with the appropriate software module or firmware module.

It should be appreciated that, the test manager computer 304 and the SCCs 416 may selectively communicate with each of the cells 212 over a parallel or a serial connection and in one of a serial or parallel protocol. Further, each cell 212 may be configured to selectively communicate with a disk drive loaded therein over a serial or parallel interface or connection. Examples of parallel interfaces include EIDI or parallel ATA (PATA). Examples of serial interfaces include SATA, SAS, and USB.

Additionally, as shown in FIG. 4, a host server 400 may store a plurality of updated software module versions 401 that may be transmitted through a network 402 to the test coordinator computer 302 where they are stored as updated software module versions 408. The network 402 may be a private network, such as a, local area network (LAN) or even a wide area network (WAN), and the plurality of updated software modules 408 may be specific to a particular disk drive manufacturer. As part of a network 400, additional host computers and/or resources 403 may be present. It should also be appreciated that instead of a private network a public network, such as the Internet, may be utilized.

In one embodiment, after the software updater module 412 of the test manager computer 304 updates the software module version for the cell (e.g., by either updating the SCC 416 for the cell or the cell itself), the test manager computer 304 under the control of test management software module 414 may store a cell identifier for the cell and the version number of the updated cell software module.

Figure 5:
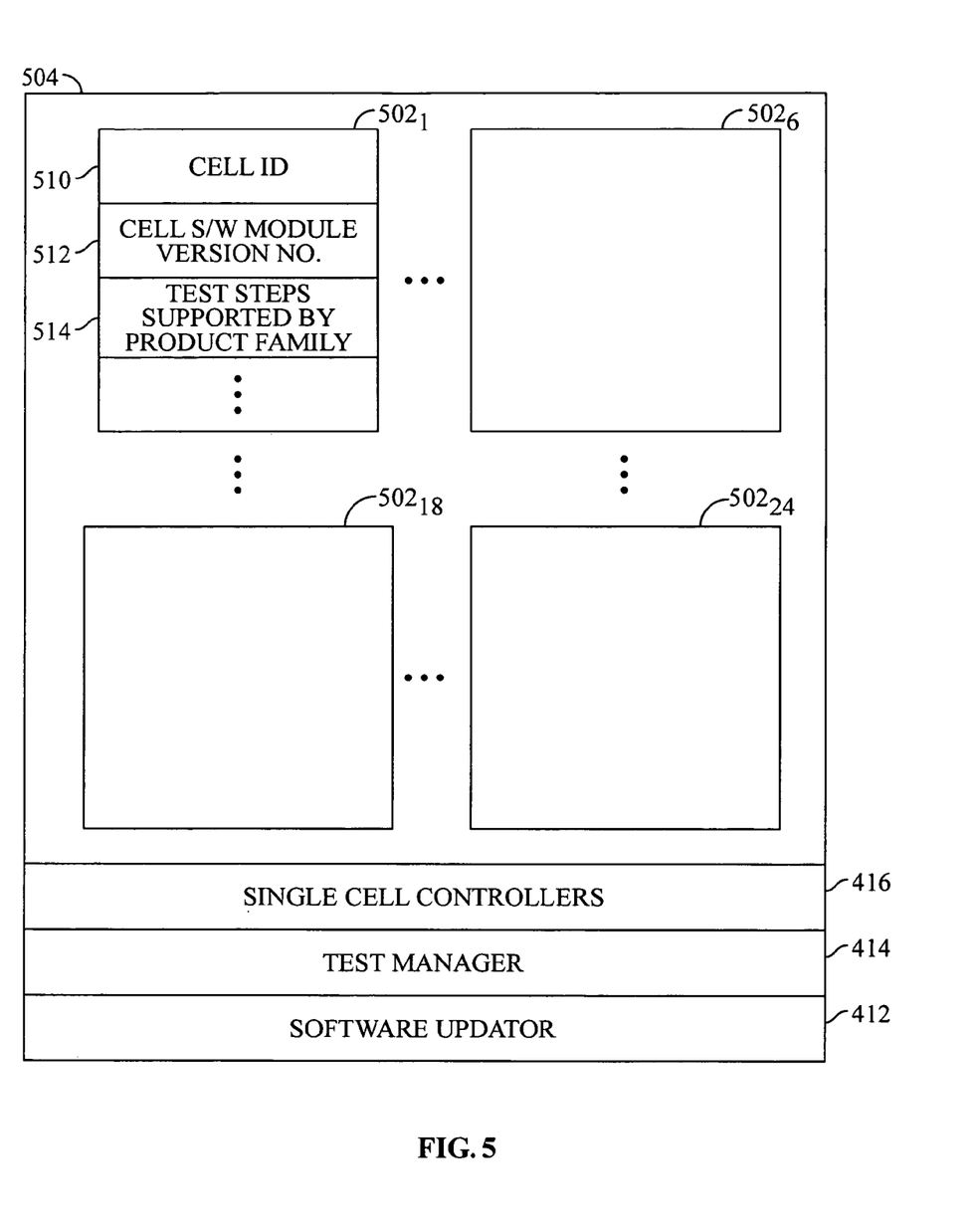
FIG. 5 is a block diagram illustrating examples of types of data stored by the test manager computer to describe cells, according to one embodiment of the invention.

Turning briefly to FIG. 5, memory 504 of test manager computer may include storage areas $502_1$-$502_{24}$ for each cell of the assigned group of cells (e.g. 24 cells), respectively, to store for each cell a cell ID 510, a cell software module version number 512 for the cell, and test steps supported by the product family of the disk drive of the cell 514. As shown in FIG. 5, this information is stored for each cell ($502_1$-$502_{24}$), respectively.

Turning back to FIG. 4, based upon the above, test manager computer 304 and SCC 416 may instruct a cell 212 to perform test steps on the disk drive utilizing the updated cell software module. Additionally, the test manager computer 304 may transmit the updated cell software module to the cell such that the cell performs the test steps on the disk drive utilizing the updated cell software module.

Additionally, host server 400 may push updated software modules 401 through the private network 402 for storage onto the test coordinator computer 302. It should be appreciated that all of the cells 212 associated with the same test manager computer 304 should have the same version of the software module updates.

It is noted that an embodiment of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 6A:
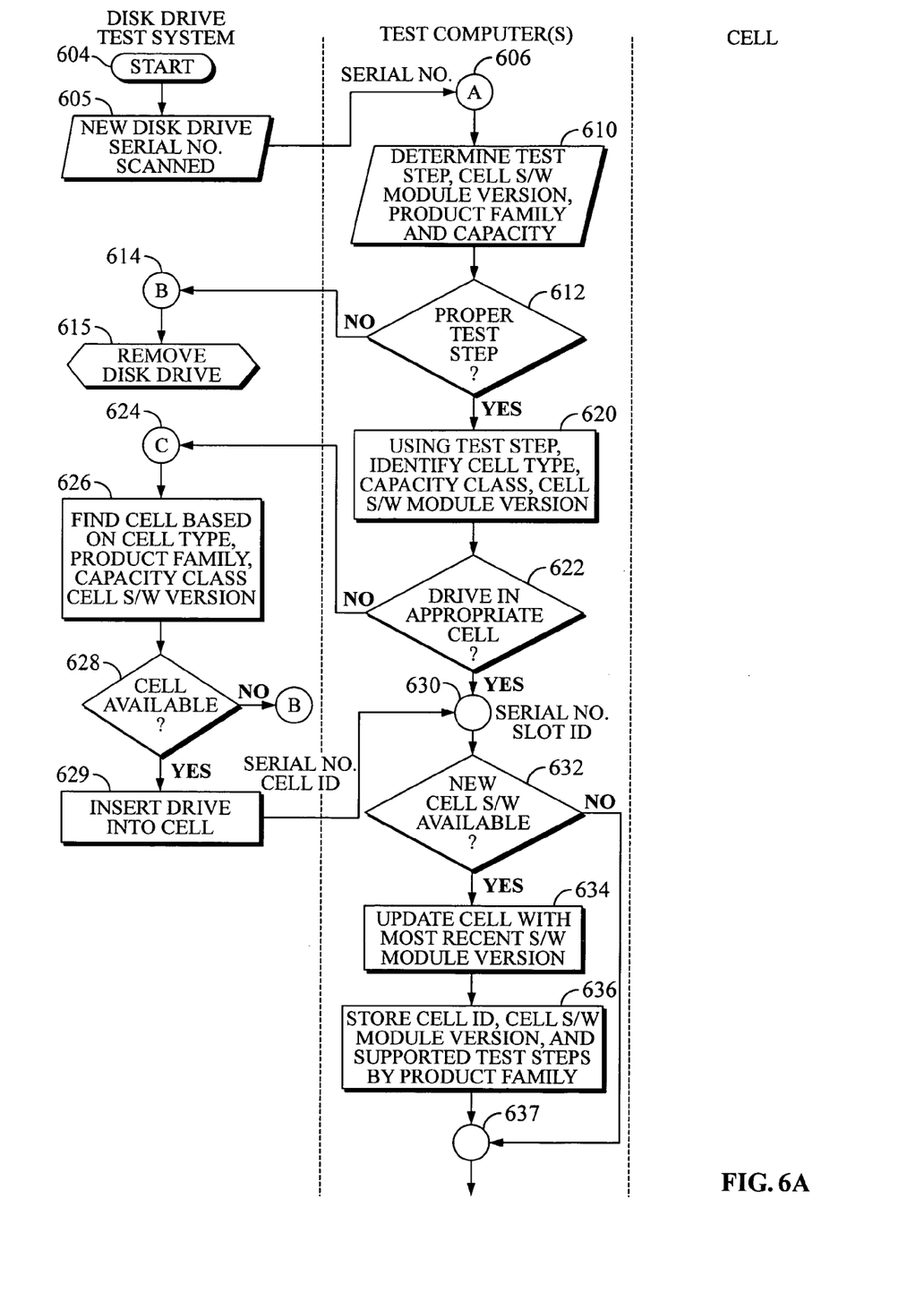
FIGS. 6A and 6B are flow diagrams illustrating a process to implement asynchronous software module updates in a multi-cell disk drive test system, according to one embodiment of the invention.
Figure 6B:
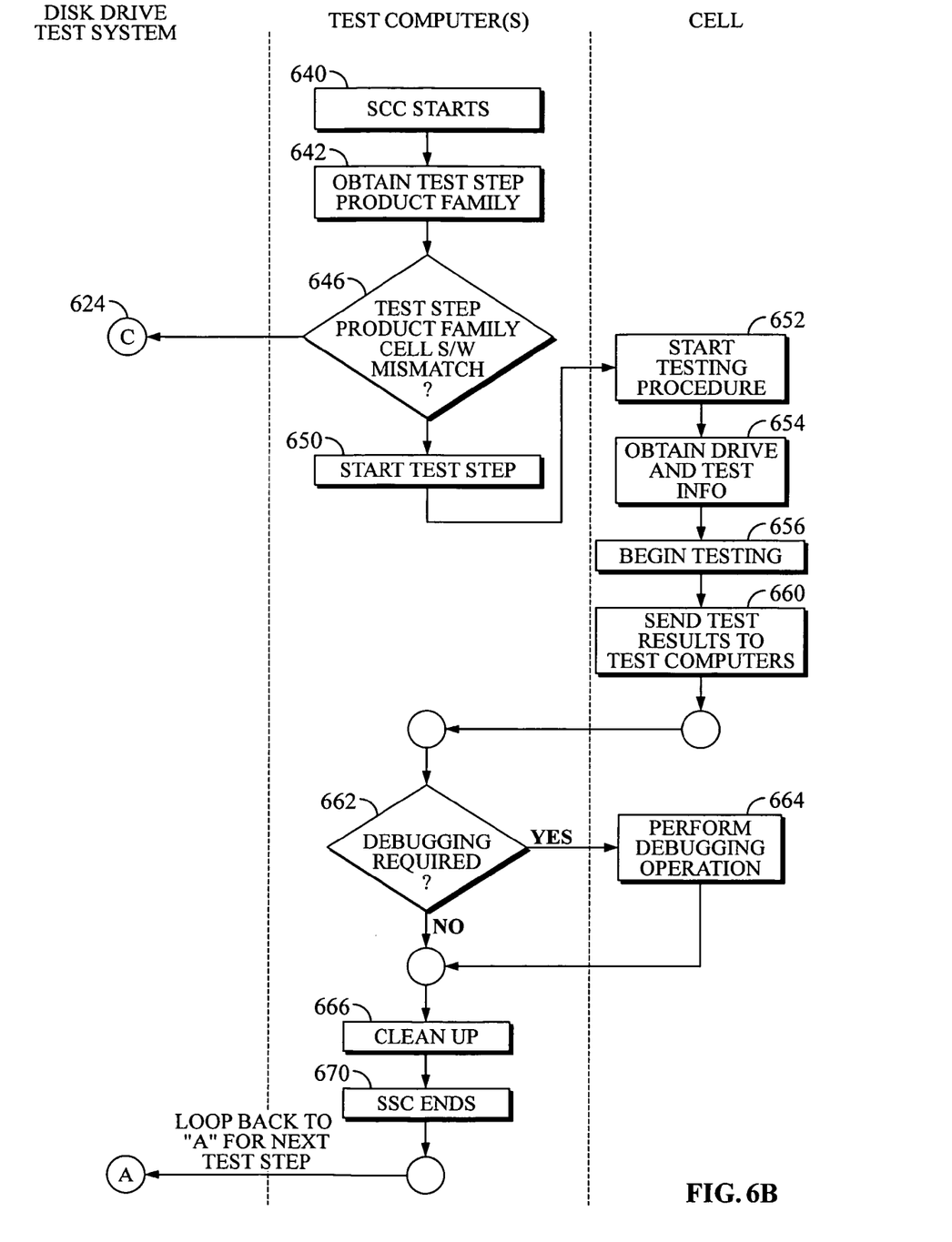

Turning now to FIGS. 6A and 6B, FIGS. 6A and 6B show a flow diagram illustrating a process to implement asynchronous software module updates in a multi-cell disk drive test system, according to one embodiment of the invention. As shown in FIGS. 6A and 6B, different method or process steps may be performed by one of the multi-cell disk drive test system, test computers, or a cell. It should be appreciated that either test manager computer 304 or test coordinator computer 302 can accomplish a particular function to be hereinafter described, however, for illustrative purposes, one or the other will be particularly described as carrying out the function.

After start 604, at block 605, a new disk drive is inserted into a cell (e.g. utilizing automatic robotic loader/unloader) and the new disk drive serial number for a disk drive is scanned by the multi-cell disk drive test system, as previously discussed. After receipt of the serial number at circle A 606, a test computer, such as test coordinator computer, determines the disk drive test step required to be performed on the disk drive, the cell software module version number, the product family of the disk drive, and the capacity of the disk drive (block 610). At decision block 612, the test coordinator computer determines whether or not the proper test step is being requested to be performed. If not, the process moves to circle B 614 and the disk drive is removed at block 615. Previously described automatic robotic loader/unloader may be utilized for this purpose.

If the proper test step is being requested, using the test step, the test coordinator computer identifies the cell type, the capacity class, and the cell software module version (block 620). At decision block 622, the test coordinator computer determines if the disk drive is in the appropriate cell. If so, the process moves to process point 630 which will be described later.

If not, the process moves to circle C 624 and the multi-cell disk drive test system attempts to find a cell for the disk drive based upon cell type, product family, capacity class, or cell software version that is compatible for the disk drive (block 626). At decision block 628, if a cell is not available, the process moves to circle B 614 and the disk drive is removed (block 615).

However, if a cell is available for the disk drive, then the multi-cell disk drive test system inserts the disk drive into the cell and obtains the serial number and cell ID (block 629). Previously described automatic robotic loader/unloader may be utilized for this purpose.

With the serial number and cell ID obtained, at process point 630, the test manager computer next determines if a new updated cell software module version associated with the test step for the cell is stored on the test coordinator computer (decision block 632), and if so, the test manager computer downloads the most recent software module version and updates the cell in the test manager computer with the updated cell software module version (block 634). As previously discussed, this may be accomplished by updating the SCC assigned to the cell or the cell itself. Further, as previously discussed, the test manager computer stores the cell ID, the cell software module version, and supported test steps by the product family for the disk drive (block 636). Next, the process moves to process point 637.

However, if new cell software is not available at decision block 632, the process skips block 634 and 636 to process point 637 and does not utilize a new updated software module but instead utilizes the existing software module.

Moving to block 640, the single cell controller (SCC) of the test manager computer begins disk drive testing operations. First, the test manager computer obtains a test step for the disk drive product family (block 642). At decision block 646, it is determined whether there is a test step product family cell software mismatch. If so, then the process moves to circle C 624 and restarts the previously described process starting at block 626.

However, if there is not a test step product family cell software mismatch, then the test step is started at block 650.

Particularly, at the cell level, at block 652, the disk drive test procedure or step is started. This includes obtaining drive and test information (block 654) and the beginning of the testing of the disk drive at block 656. After testing is complete, the test results are sent back to the test computers (e.g. the test manager computer and the test coordinator computer) at block 660.

Next, at decision block 662, it is determined whether the debugging is required. If so, the debugging operations are performed at 664. After debugging, or if debugging is not required, clean-up is then performed (block 666) and the single cell controller (SCC) testing ends (block 670). The process then loops back to circle A 606 for the next test step to be performed on the disk drive and the process begins again.

By utilizing the previously-described process to provide asynchronous automatic software module updates in a multi-cell disk drive test system, updated software modules may be introduced asynchronously into the system without undue disruption of the system such that productivity and throughput is maintained. This may result in a great deal of cost savings to disk drive manufacturers.

It should be appreciated by those with skill in this art that, although embodiments of the invention have been previously described with reference to particular test computers and software modules, that embodiments of the invention may be utilized in a wide variety of differing multi-cell disk drive test systems utilizing various types of computers, test equipment, software, firmware, interfaces, etc.

We claim:

1. A multi-cell disk drive test system that provides for asynchronous software module updates, comprising:
    a test platform that includes a plurality of cells, each cell being configured to receive and to provide communication with a disk drive, the plurality of cells being segregated into a plurality of groups;
    a test manager computer assigned to each group of cells, each test manager computer being coupled to an assigned group of cells to administer at least of one of a plurality of test steps to disk drives loaded in the assigned group of cells;
    a test coordinator computer configured to communicate with each test manager computer and to store a plurality of updated software module versions;
    wherein after a disk drive is determined to be in an appropriate cell, the test manager computer to:
        determine a test step to be performed on the disk drive and a cell software module currently stored for the cell;
        determine if an updated cell software module version associated with the test step is stored on the test coordinator computer, and if so,
            download the updated cell software module version;
            update the test manager computer with the updated cell software module version; and
            store a cell identifier for the cell, the version number of the updated cell software module, and the test steps supported by the cell.

2. The system of claim 1, further comprising a host server storing a plurality of updated software module versions that are transmitted through a network to the test coordinator computer.

3. The system of claim 2, wherein the network is a private network and the plurality of updated software module versions are specific to a particular disk drive manufacturer.

4. The system of claim 1, wherein the test manager computer instructs the cell to perform the test step on the disk drive utilizing the updated cell software module.

5. The system of claim 1, wherein the test manager computer transmits the updated cell software module to the cell such that cell performs the test step on the disk drive utilizing the updated cell software module.

6. The system of claim 1, further comprising an automated loader/unloader configured to selectively load disk drives into and out of the test platform and to move disk drives between the plurality of groups.

7. The system of claim 1, wherein the automated loader/unloader is a robotic loader/unloader.

8. The system of claim 1, wherein each cell is configured to selectively communicate with a disk drive loaded therein over a serial or parallel interface.

9. The system of claim 1, wherein each test manager computer is configured to selectively communicate with a cell of the group of cells in one of a serial or parallel protocol.

10. A method for providing asynchronous software module updates in a multi-cell disk drive test system used for testing a plurality of disk drives that includes a test platform having a plurality of cells, each cell being configured to receive and to provide communication with a disk drive, the plurality of cells being segregated into a plurality of groups, the method comprising:
    determining a test step to be performed on the disk drive;
    determining a cell software module currently stored for the cell;
    determining if an updated cell software module version associated with the test step is available for downloading, and if so,
        downloading the updated cell software module version;
        utilizing the updated cell software module to perform the test step on the disk drive of the cell; and
        storing a cell identifier for the cell, the version number of the updated cell software module, and the test steps supported by the cell.

11. The method of claim 10, further comprising:
    storing a plurality of updated software module versions at a host server; and
    transmitting the updated software modules through a network for use by the cell.

12. The method of claim 11, wherein the network is a private network and the plurality of updated software module versions are specific to a particular disk drive manufacturer.

13. The method of claim 10, wherein an automated loader/unloader selectively loads disk drives into and out of the test platform and moves disk drives between the plurality of groups.

14. The method of claim 10, wherein each cell is configured to selectively communicate with a disk drive loaded therein over a serial or parallel interface.

15. The method of claim 10, further comprising communicating with a cell of the group of cells in one of a serial or parallel protocol.

16. In a multi-cell disk drive test system used for testing a plurality of disk drives that includes a test platform having a plurality of cells, each cell being configured to receive and to provide communication with a disk drive, the plurality of cells being segregated into a plurality of groups, a computer-readable medium of a storage device having tangibly stored thereon instructions, which when executed by a computer, cause the computer to perform the following operations comprising:
    determining a test step to be performed on the disk drive;
    determining a cell software module currently stored for the cell;
    determining if an updated cell software module version associated with the test step is available for downloading, and if so,
        downloading the updated cell software module version;
        utilizing the updated cell software module to perform the test step on the disk drive of the cell; and
        storing a cell identifier for the cell, the version number of the updated cell software module, and the test steps supported by the cell.

17. The computer-readable medium of claim 16, further comprising instructions to perform the operations of storing a plurality of updated software module versions received through a network from a host server for use by the cell.

18. The computer-readable medium of claim 17, wherein the network is a private network and the plurality of updated software module versions are specific to a particular disk drive manufacturer.

19. The computer-readable medium of claim 18, further comprising instruction to perform the operations of communicating with a cell of the group of cells in one of a serial or parallel protocol.

20. The computer-readable medium of claim 16, wherein each cell is configured to selectively communicate with a disk drive loaded therein over a serial or parallel interface.

* * * * *